UNITED STATES PATENT OFFICE.

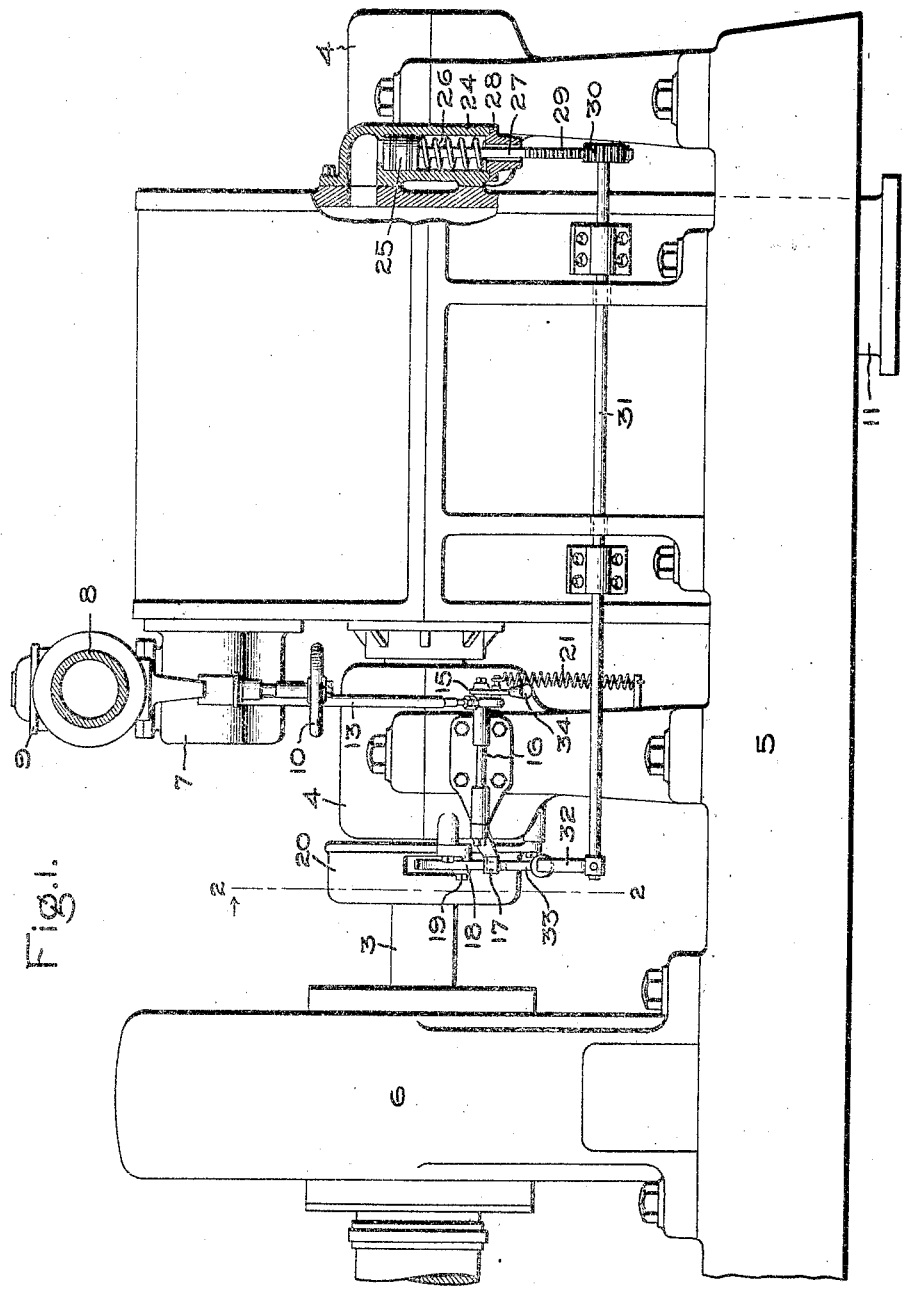

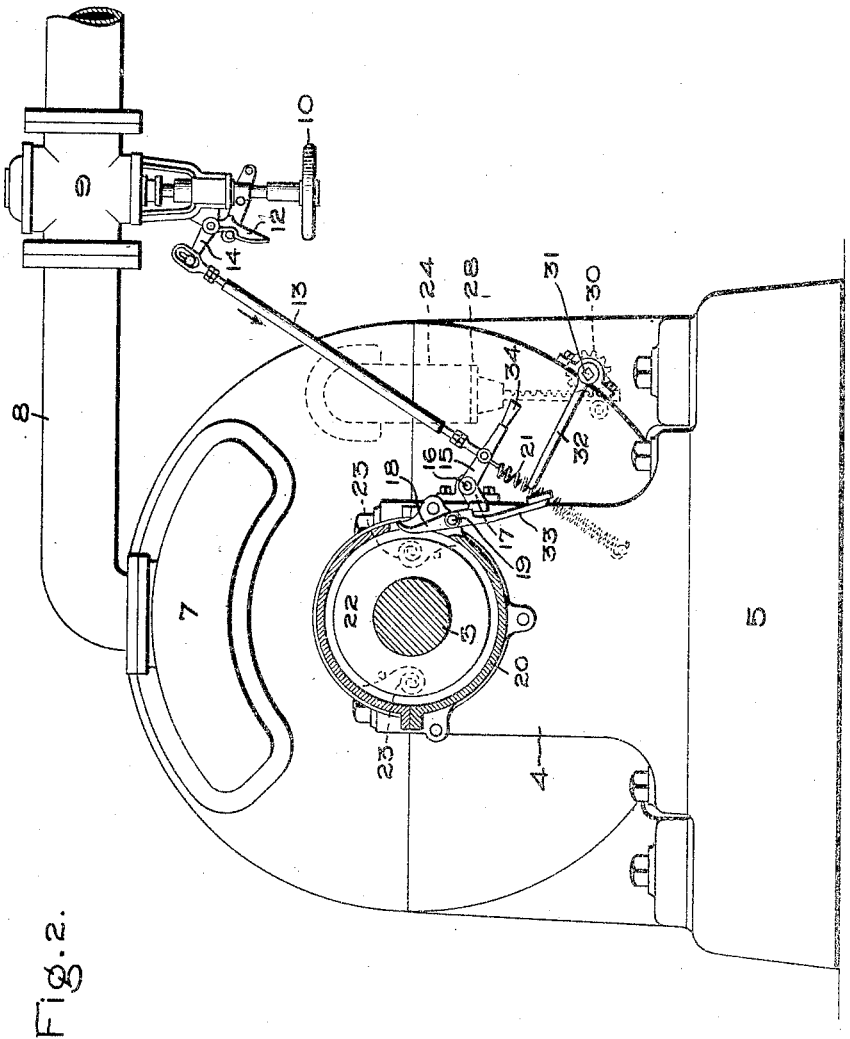

EDGAR F. DUTTON, OF SCHENECTADY, NEW YORK, ASSIGNOR TO GENERAL ELECTRIC COMPANY, A CORPORATION OF NEW YORK.

EMERGENCY GOVERNING MECHANISM FOR TURBINES.

960,289.     Specification of Letters Patent.     Patented June 7, 1910.

Application filed June 18, 1909. Serial No. 502,940.

*To all whom it may concern:*

Be it known that I, EDGAR F. DUTTON, a citizen of the United States, residing at Schenectady, in the county of Schenectady, State of New York, have invented certain new and useful Improvements in Emergency Governing Mechanisms for Turbines, of which the following is a specification.

This invention relates to elastic fluid turbines and its object is the provision of mechanism for safeguarding a turbine against injury due to abnormal pressure within any given region of the turbine, and particularly within what might be called the low pressure stage or stages of a multi-stage turbine, and against injury due to abnormal or excessive speed of rotation. To accomplish this end said mechanism operates to automatically shut off the supply of motive fluid to the turbine whenever a predetermined safe pressure or speed is exceeded. It can, however, be manually operated when necessary, and the pressure-responsive mechanism can be used with or without the other mechanism as desired.

In the accompanying drawings illustrating one of the embodiments of my invention, Figure 1 is a side view of a turbine with parts in section; and Fig. 2 is an end view of the turbine showing certain parts in section on the line 2—2 of Fig. 1.

In the turbine chosen to illustrate the invention the rotor is carried by a shaft 3 mounted in bearings 4 supported by a bedplate 5. The shaft 3 drives an electric generator 6 or other load. Steam or other motive fluid is conveyed to the steam chest 7 of the turbine by a pipe 8 leading from any suitable source of supply. Located in the pipe line 8 is a combined emergency and throttle valve 9 of any well known construction. The one shown is of the so-called sliding nut type, wherein the nut is normally held in position by a latch or trigger, which latch is moved by the speed governor when it is desired to have the valve close suddenly. This valve can be manually operated by means of the hand wheel 10 and its screw-threaded stem and nut to control the flow of steam through the pipe 8, and it can also be tripped to close suddenly under emergency conditions by mechanism to be described later. Obviously separate valves could be employed to perform each of these functions if desired. The exhaust steam from the turbine is led away from the pipe 11 to a condenser or to the atmosphere, as preferred.

The admission of motive fluid from the steam chest 7 to the interior of the turbine to drive the turbine rotor can be controlled by any suitable governing mechanism (not shown) which proportions the supply of energy to the load and thus maintains the speed of rotation constant. Under some conditions this automatic governing mechanism can be omitted and the speed controlled by throttling the supply of steam to the rotor by a suitable hand valve or valves. The valve 9 might be used for this purpose under some circumstances.

Under normal operating conditions a latch or trigger 12 holds the valve 9 open in any position to which it may have been adjusted by the wheel 10. This valve has a constant tendency to close, due to unbalanced steam pressure or gravity or both. The valve may be assisted in its closing operation by any suitable type of motor or mechanism or a combination of the two. The rod or link 13 has at one end a sliding and pivotal connection with the arm 14 of the latch 12. The other end of the rod 13 is pivotally connected with a lever or arm 15 on a shaft 16 mounted in bearings on one of the pillow blocks 4. The shaft 16 also carries an arm 17 that engages a trigger or lever 18 pivoted at 19 on the casing 20. The parts 15, 16 and 17, together form a sort of bell-crank lever. The spring 21 tends to turn this lever about its pivot and it is normally held against turning by the trigger 18. Mounted on the shaft 3 within the casing 20 is an emergency speed governing device 22 of any approved construction. One end of the trigger 18 projects through an opening in the casing into rather close proximity to the governor 22.

When the speed of the turbine rises above a predetermined safe limit the governor strikes against the adjacent end of the trigger and releases the bell-crank lever 15, 16, 17 from its restraint. The spring 21 is then free to move the rod 13 in the direction of the arrow, Fig. 2, and through said rod to release the latch 12 to permit the valve 9 to close suddenly, thereby shutting off the supply of steam to the turbine. The sliding connection between the end of the rod 13 and the arm 14 causes the spring 21 to impart a hammer blow to the latch, thus insuring the quick and effective release of said latch. The form of emergency speed governor illustrated includes two clock springs 23 that normally occupy the positions shown in Fig. 2. When the speed of the turbine rises above the predetermined safe limit, the ends of the springs move outward under the influence of centrifugal force and strike the projecting end of trigger 18, thereby tripping the latch and closing valve 9 in the manner above described.

The mechanism illustrated for shutting down the turbine when the steam pressure in any given region thereof rises above a desirable or safe limit includes a cylinder 24 connected at one end with said region. A piston 25 is mounted in the cylinder. The outward movement of the piston is opposed by a spring 26 surrounding the piston rod 27 and interposed between the piston and the head 28 of the cylinder. The outer end of the piston rod carries a rack 29 that meshes with a pinion 30 carried by a shaft 31 mounted in suitable bearings and extending longitudinally of the turbine. The end of the shaft 31 adjacent the emergency governor 22 is provided with an arm or lever 32. The trigger 18 has an arm 33 which extends downward so that its outer end is adjacent the end of the arm 32. When the pressure on the piston 25 rises sufficiently to overcome the spring 26, the piston is moved outward causing the rack 29 to rotate the pinion 30 and the shaft 31. The arm 32 swings around with the shaft and strikes the arm 33 of the trigger, thereby tripping the lever 15, 16, 17 and permitting the spring 21 to release the emergency valve and permit it to close, as described above in connection with the closing of the valve by the emergency speed governor. Obviously the pressure-responsive mechanism can be used without the speed-responsive mechanism if desired.

The end of the arm 33 is placed in a readily accessible location, so that the trigger 18 can also be manually operated, thus permitting the attendant to quickly close the valve 9 and shut down the turbine when desired. The lever arm 15 is provided with a handle 34 to facilitate the resetting of the valve-tripping mechanism in the position shown in the drawing.

The cylinder 24 may be connected with any desired region of the turbine. In the drawings it is shown as arranged to receive the pressure of the low pressure or exhaust stage of the turbine, but it can be connected to any other stage or region of a turbine as required by the operating conditions.

My invention is not limited to the particular form or arrangement of mechanism illustrated for transmitting motion from the piston 25 to trip the emergency valve. Levers, or other equivalent devices, can be substituted for the gearing shown and the disposition of the parts changed to suit the design and arrangement of the turbine to which the invention is applied.

The abnormal rise in pressure in a given stage or region may be due to various causes, such as, among others, the loss of vacuum in the condenser of a condensing turbine installation, or the obstruction of the turbine exhaust by the failure of the attendant to properly open the valves in the exhaust conduits, or the obstruction of the pipes taking steam from one of the intermediate stages of a turbine for industrial purposes, or to the failure of the regulating mechanism in a mixed pressure turbine to properly control the admission of high pressure motive fluid to said turbine.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. In combination, a turbine, a conduit for supplying motive fluid from a suitable source to the turbine, a valve for controlling the flow of motive fluid through the conduit to the turbine, and means responsive to a rise in pressure above a predetermined limit in a given region of said turbine which effects the closing of said valve and thereby shuts down the turbine.

2. In combination, a turbine, a conduit for supplying motive fluid to the turbine, a valve for controlling the flow through the conduit which can be manually opened and closed slowly for normal operation and closed suddenly under emergency conditions, and means responsive to a rise of pressure above a predetermined limit in a given region of the turbine which effects the sudden closing of said valve and thereby shuts down the turbine.

3. In combination, a turbine, a conduit for supplying motive fluid to the turbine, a valve for controlling the flow through the conduit which can be tripped to close suddenly under emergency conditions, a device responsive to a rise in pressure above a predetermined limit in a given region of the turbine which effects the tripping of said valve and thereby shuts down the turbine, and means for manually tripping said valve to shut down the turbine when desired.

4. In combination, a turbine, a valve for controlling the supply of motive fluid to the turbine which can be tripped to close suddenly under emergency conditions, and means responsive to a predetermined rise of pressure in a given region of the turbine which effects the tripping of said valve and thereby shuts down the turbine, said means including a member which tends to move under the influence of the pressure in said region and a device which opposes its movement.

5. In combination, a turbine, a valve for controlling the supply of motive fluid to the turbine, mechanism for tripping the valve to close it suddenly under emergency conditions, a lever pivoted adjacent the tripping mechanism, and a device responsive to a predetermined rise of pressure in a given region of the turbine which moves said lever and causes it to bring said tripping mechanism into action to thereby close the valve.

6. In combination, a turbine, a valve for controlling the supply of motive fluid to the turbine, mechanism for tripping the valve to close it suddenly under emergency conditions, a lever pivoted adjacent the tripping mechanism, a device responsive to a predetermined rise of pressure in a given region of the turbine which moves said lever and causes it to bring said tripping mechanism into action to thereby close the valve, said device including a member which tends to move under the influence of the pressure in said region and a spring which opposes its movement.

7. In combination, a turbine, a valve for shutting off the supply of motive fluid to the turbine, mechanism for tripping the valve to close it suddenly under emergency conditions, and a device responsive to a predetermined rise of pressure in a given region of the turbine which effects the tripping of said valve and thereby shuts down the turbine, said device including a cylinder connected with said region, a piston in the cylinder which tends to move in a given direction under the influence of the pressure in said region, a spring which opposes the movement of the piston, and means actuated by the movement of the piston which brings the tripping mechanism into action.

8. In combination, a turbine, a valve for shutting off the supply of motive fluid to the turbine, mechanism for tripping the valve to close it suddenly under emergency conditions, and a device responsive to a predetermined rise of pressure in a given region of the turbine which effects the tripping of said valve and thereby shuts down the turbine, said device including a cylinder connected at one end with said region, a piston in the cylinder which tends to move in a given direction under the influence of the pressure in said region, a piston rod, a spring which opposes the movement of the piston and rod, a lever adjacent the tripping mechanism, a rotatable shaft on which the lever is mounted, and means connecting the piston rod and the shaft whereby the movement of said rod swings the lever about its pivot and causes it to release the tripping mechanism.

9. In combination, a prime mover, a regulator therefor which has a self-closing tendency, means for resisting said tendency, a speed governor for tripping the said means, a pressure-responsive device for tripping the means, and a manually actuated device for tripping said means.

10. In combination, a turbine, an emergency valve for shutting off the supply of motive fluid to the turbine, a trigger for releasing said valve to shut down the turbine, a device responsive to a predetermined rise of pressure in a given region of the turbine which operates the trigger to cause it to release the emergency valve, a device responsive to a predetermined increase in the speed of the turbine which operates said trigger to release said valve, and means for manually operating said trigger to cause it to release said valve.

11. In combination, a turbine, a valve for controlling the supply of motive fluid to the turbine including a tripping device by means of which the valve can be closed, and means responsive to the pressure in a given region of the turbine which operates the tripping device to close the valve when said pressure rises above a predetermined limit.

12. In combination, a turbine, a valve for controlling the supply of motive fluid to the turbine which has a tendency to close, a trigger for holding the valve open against said tendency, and means responsive to the pressure in a given region of the turbine which releases the valve from the control of the trigger and permits said valve to close when said pressure rises above a predetermined limit.

In witness whereof, I have hereunto set my hand this 17th day of June, 1909.

EDGAR F. DUTTON.

Witnesses:
　BENJAMIN B. HULL,
　HELEN ORFORD.